United States Patent [19]

Takacs

[11] Patent Number: 4,650,403
[45] Date of Patent: Mar. 17, 1987

[54] WINDMILL

[76] Inventor: Joseph Takacs, 1010 Carnegie Ave., Akron, Ohio 44314

[21] Appl. No.: 836,808

[22] Filed: Mar. 6, 1986

[51] Int. Cl.<sup>4</sup> ............................................... F03D 3/06
[52] U.S. Cl. .............................. 416/197 A; 416/196 A
[58] Field of Search ......................... 416/197 A, 196 A

[56] References Cited

U.S. PATENT DOCUMENTS

| 154,407 | 8/1874 | Mason | 416/197 A |
| 259,563 | 6/1882 | Lowther | 416/197 A X |
| 727,762 | 5/1903 | Edgar | 416/197 A X |
| 1,413,861 | 4/1922 | McDowell | 416/197 A X |
| 1,485,649 | 3/1924 | Van Leggelo | 416/197 A X |
| 2,007,963 | 7/1935 | Cleveland | 416/197 A X |
| 3,930,750 | 1/1976 | Schultz | 416/197 A |
| 4,037,898 | 7/1977 | Huther | 416/197 A |
| 4,118,637 | 10/1978 | Tackett | 416/197 A X |
| 4,260,325 | 4/1981 | Cymara | 416/197 A X |
| 4,382,191 | 5/1983 | Potter | 416/197 A X |

FOREIGN PATENT DOCUMENTS

| 2460075 | 7/1976 | Fed. Rep. of Germany | 416/197 A |
| 2922593 | 12/1980 | Fed. Rep. of Germany | 416/197 A |
| 61140 | 3/1955 | France | 416/197 A |
| 2308803 | 11/1976 | France | 416/197 A |
| 19401 | of 1891 | United Kingdom | 416/197 A |
| 196546 | 4/1923 | United Kingdom | 416/197 A |

Primary Examiner—Everette A. Powell, Jr.
Attorney, Agent, or Firm—Oldham, Oldham & Weber Co.

[57] ABSTRACT

A windmill having a rotatable vertical shaft and a rotor secured thereto. The rotor has a plurality of base circumferential wings for collecting the wind. Each wing includes a vertically extending cylindrically curved surface, preferably a half cylinder, and top and bottom end plates. Each curved surface has a plurality of vertical metal reinforcing strips on its concave side extending from top to bottom. These reinforcing strips strengthen the windmill and improve its efficiency. Rotation of the shaft and motor generates power which may be used to drive an electric generator, an air compressor, or other energy transducer devices.

7 Claims, 6 Drawing Figures

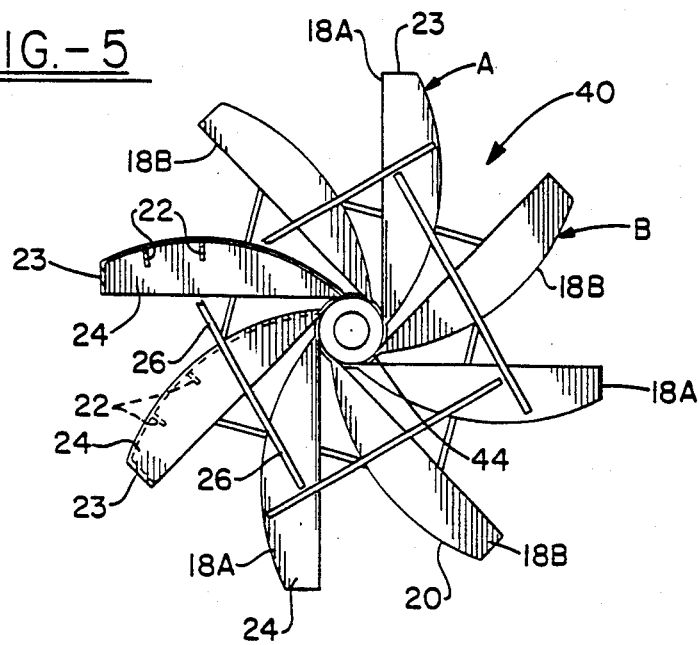
FIG.-5
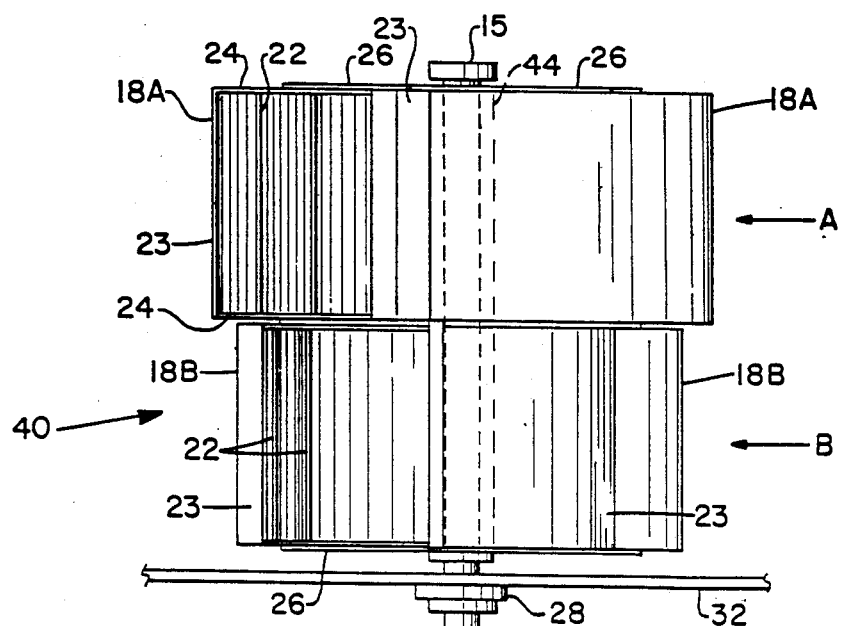
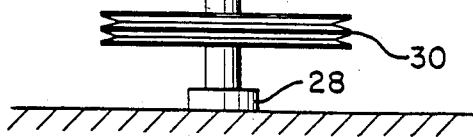

WINDMILL

TECHNICAL FIELD

This invention relates to wind driven power generation devices, or windmills as they are more popularly known.

BACKGROUND ART

Windmills have been known for decades and perhaps centuries. Windmills were used to an appreciable extent, particularly on farms, during the early part of this century. Their use declined during the middle of this century as low cost energy from fossil fuels became increasingly available. Within the last decade or so, sharply rising costs of fossil fuels, coupled with the realization that supply of fossil fuels is not inexhaustable, has once again led to an interest in windmills. Even so, wind driven devices today produce only a very small fraction of the world's energy needs. This is no doubt due in large part to deficiencies in wind driven energy producing devices currently available.

U.S. Pat. No. 4,204,795 to Forrest describes a device for transforming wind energy into rotary motion, or a windmill which comprises a plurality of semi-cylindrical wind collecting blades circumferentially spaced about a horizontal shaft. The device is placed in a pit dug in the earth's surface, and mounds of earth are piled up on either side to serve as deflectors for directing the wind only against the upper portion of the apparatus. A generally similar apparatus is shown in U.S. Pat. No. 4,357,130, also to Forrest.

U.S. Pat. No. 4,269,563 to Sharak et al, shows a wind turbine or windmill comprising a vertical rotating shaft, a rotar having a large number of circumferentially spaced semi-circular wind collectors, and air guides to direct air against the collectors and thereby improve efficiency of the device.

The Forrest devices apparently require a horizontal shaft, a pit and mounds of earth on either side for most efficient operation. The considerable earth moving required adds tremendously to the cost of installing such device. This in turn greatly limits the usefulness of these devices.

The Sharak et al device requires air guides for most efficient operation. While the cost of providing air guides does not approach the cost of earth moving as required in the Forrest devices, nevertheless such air guides do add appreciable to the cost of the windmill.

DISCLOSURE OF INVENTION

It is an object of this invention to provide a simple device for harnessing wind energy and producing useful energy therefrom.

It is a further object of this invention to provide a windmill of simple and low cost construction but which is nevertheless efficient at converting wind energy into mechanical energy.

It is an object of the present invention to provide a windmill having cylindrically curved wind collecting surfaces having longitudinally extending metal ribs which serve to reinforce the curved surfaces and to improve energy conversion efficiency.

These and other objects of the invention will be apparent from the disclosure which follows and the accompanying drawings.

According to the present invention there is provided a windmill comprising a rotatable shaft and a rotor secured to this shaft, said rotor comprising a plurality of circumferentially spaced blades or wings, each of which has a cynlindrically curved surface for collecting the wind, the curved surfaces of all the wings being oriented in the same direction, and a plurality of stiffening ribs adjacent to each of said curved surfaces, said stiffening ribs extending along said curved surfaces in a direction parellel to the shaft.

BRIEF DESCRIPTION OF DRAWINGS

In the drawings:

FIG. 5 is a top plan view of a windmill according to the second embodiment of the invention.

FIG. 6 is a front elevational view of a windmill according to the second embodiment of the invention.

BEST MODE FOR CARRYING OUT INVENTION

This invention will now be described in detail with reference to specific and preferred embodiments thereof.

Figure 1:
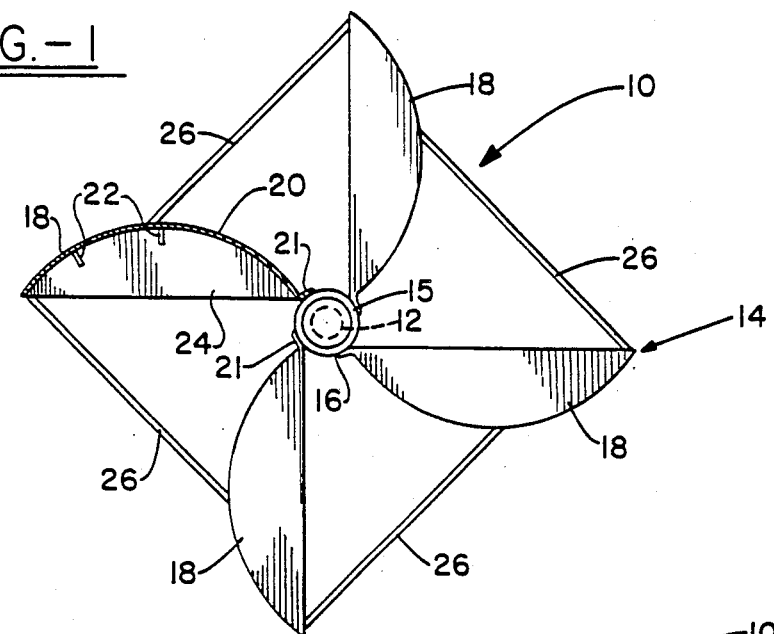
FIG. 1 is a top plan view of a windmill according to the first embodiment of the invention, with a portion of one wing broken away and the remaining portion shown in section.
Figure 2:
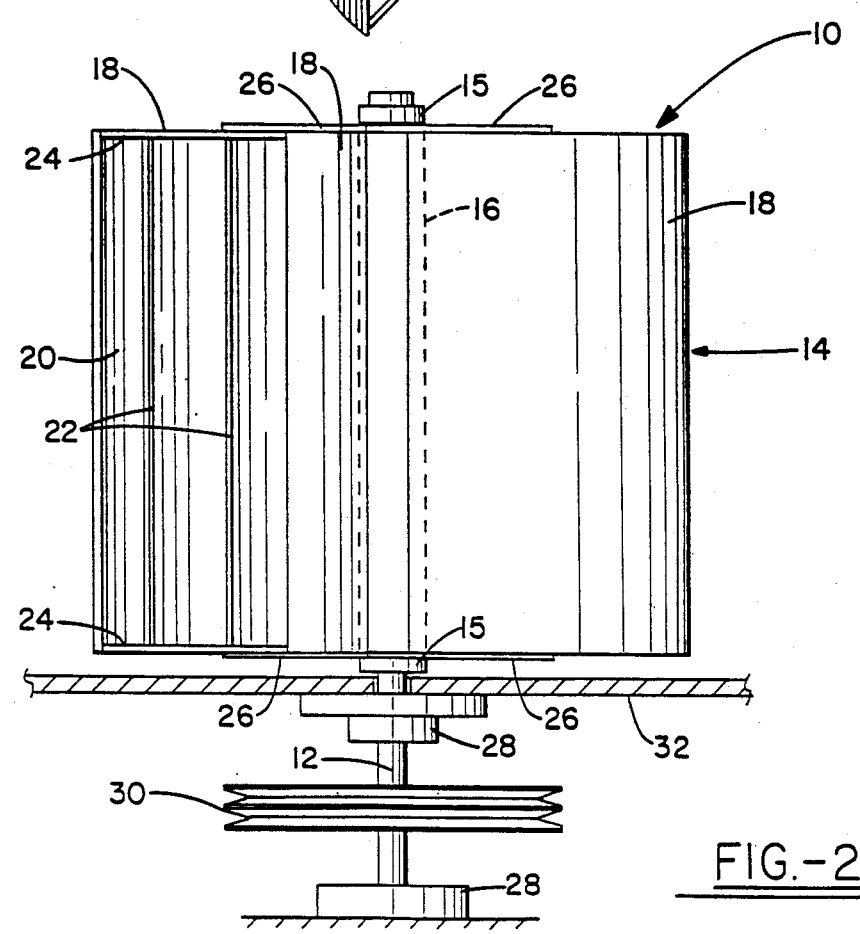
FIG. 2 is a front elevational view of the windmill of the first embodiment of the invention.
Figure 3:
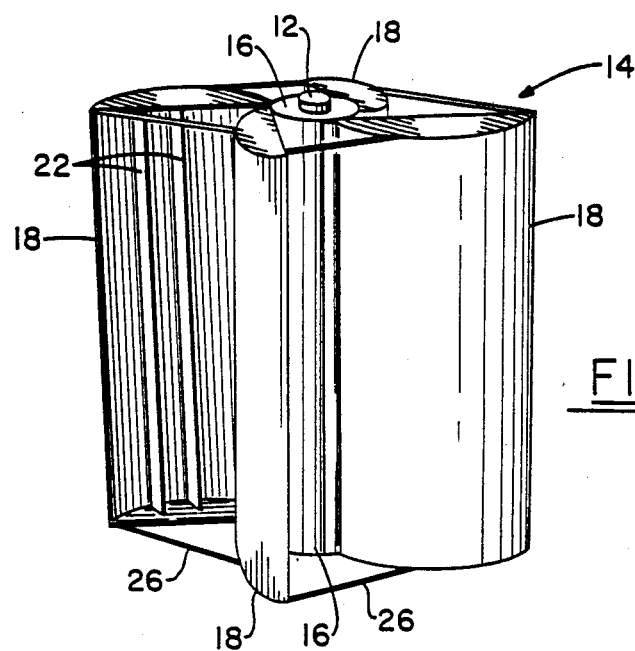
FIG. 3 is a perspective of the rotor in the first embodiment of the invention.

FIGS. 1 to 3 illustrate the present invention according to a first embodiment thereof. Referring now to FIGS. 1–3, 10 indicates generally a wind driven energy conversion device or windmill according to the first embodiment of this invention. Windmill 10 includes a rotatable vertical shaft 12, and a rotor 14 which is secured to shaft 12 so that the shaft and the rotor rotate together. Rotor 14 is mounted on shaft 12 between collars 15, which are secured to shaft 12.

Rotor 14 includes a tubular central core or hub 16 which surrounds the upper portion of shaft 12 between collars 15, and a plurality of wings or vanes 18 for collecting the wind. Wings 18 are uniformly spaced circumferentially. As shown, there are 4 wings 18 at 90 degree intervals about the circumference of hub 16. Any desired number of wings 18 (at least 3) may be provided.

Each wing 18 includes a cylindrically curved surface, such as a half cylinder, or a quater cylinder or even a portion (say one-half) of a parabolic cylinder. Usually the cylindrically curved surface is a portion (one- half or less) of a right circular cylinder. Curved surface 20 has only one direction of curvature, i.e. perpendicular to the axis of shaft 12. The curved surfaces 20 of this embodiment extend the entire height of rotor 14.

Curved surfaces 20 are four-sided, having curved horizontal ends at the top and bottom, and straight vertical sides which extend from top to bottom. Each wing 18 is attached to hub 16 by welding or bolting, for example, along the inner side or edge of curved surface 20. A thin flange or lip 21 may be provided along the inner edge to facilitate attachment.

All of the wings 18 are oriented in the same direction of rotation. That is, the convex sides of curved surfaces 20 either face clockwise (as shown in FIG. 1) or counterclockwise. Wind causes the rotor 14 shown in FIG. 1 to rotate clockwise. The concave sides of curved surfaces 20 collect the wind, converting wind energy into mechanical energy that causes rotation. The convex sides of curved surfaces 20 deflect the wind, so that the wind exerts an appreciably smaller net force against the convex sides of curved surfaces 20 than against the concave sides. This imbalance causes rotor 14 to rotate. The convex sides behave similarly to airfoils so that the wind offers comparatively little resistance against the convex sides of curved surfaces 20.

Each of the curved surfaces 20 has a plurality of vertical ribs 22 extending from the top to the bottom of the curved surface 20 on the concave side thereof. For simplicity in drawiing, ribs 22 are shown on only one of the four wings 18. Two such ribs are shown; more ribs may be supplied as desired. These ribs are sheet metal strips which are placed at right angles to the curved surface 20 at the point of intersection. Ribs 22 are straight and vertical, since the curved surfaces have no curvature in the vertical direction.

Ribs 22 serve two purposes. First, and foremost, they improve the wind collection efficiency of wings 18 by reducing cross currents and eddy currents adjacent to concave surfaces 20. This means that, for a given windmill size and wind velocity, greater power output is realized in a windmill having ribs 22 as shown than would be obtained in an otherwise identical windmill lacking ribs 22. This is an important feature of the invention, because it obviates the necessity of providing more complicated or expensive structures in order to obtain reasonable efficiency and power output. Another purpose served by ribs 22 is to reinforce the curved surface 20 and impart greater rigidity thereto. This increased rigidity is particularly useful in enabling the curved surface 20 to withstand high wind forces against the convex side without danger of collapsing or bending. This in turn improves the efficiency of the convex surfaces as deflectors of the wind.

Figure 4:
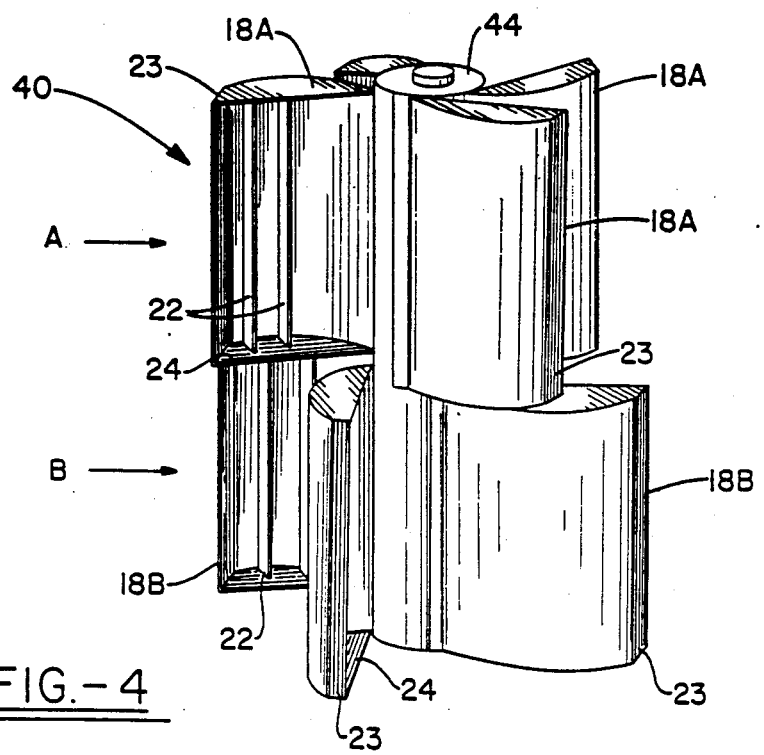
FIG. 4 is a perspective view of the rotor according to a second embodiment of the invention.

Wings 18 may be provided with vertical strips 23 at the tips, ahown in FIGS. 4-6, if desired.

Each of the wings 18 has horizontal end plates 24 at the top and bottom thereof. These end plates 24 intersect the curved surfaces 20 along the upper and lower ends of the latter. Each end plate has a curved (usually arcuate) leading edge at the intersection with the adjacent curved surface 20, and a straight edge (the trailing edge) which extends from the outer to the inner edge of the curved surface 20. These end plates 24 appreciably improve the wind collection efficiency of the wings 18 by inhibiting the entry of air to the inside of rotor 14 and thereby reducing air turbulence within the rotor. The straight edges of plates 24 do not lie along radii of device 10; rather, the straight edges are slightly forward (in the direction of rotation) of the radii to which they are parallel.

Horizontal braces 26, extending from the upper and lower portions of each wing 18 to the corresponding portions of the next adjacent wing 18, may be provided for structural strength. Each brace typically extends from near the outer extremity of each end plate 24 to approximately the mid point of the curved edge of the lower end plate 24 of the next adjacent wing 18.

Shaft 12 is journaled for rotation in bearings 28. In the preferred device illustrated, both bearings 28 are located below rotor 14. One of the bearing 28 is located at the very bottom of shaft 12 and the other is spaced therefrom, a short distance below the bottom of rotor 14.

A drive element 30 is secured to shaft 12 between bearings 28. This drive element 30 provides the means for coupling the shaft 12 to a power producing device, such as an electric generator or an air compressor (not shown). For example, where the device of the present invention is to drive an electric generator, drive element 30 may be a wheel or pulley that will receive a drive belt which is similarly coupled to an electric generator.

The bearing 28 and drive element 30 may be housed inside a housing, the top wall 32 of which is shown in FIG. 2.

Wind impinging against the device 10 in any direction (except vertically) will cause the device to rotate. The device will rotate clockwise as seen in FIG. 1. The concave sides of surfaces 20 collect the wind, while the convex sides deflect the wind, as is well known. Therefore, the force exerted by the wind against the concave side of the curved surface 20 which is receiving the wind will more than offset the counter force against the convex side of the diametrically opposite wing 18.

The device of the present invention may be made out of any desired material; sheet metal such as carbon steel, stainless steel; aluminum is the preferred material of construction for core 16, curved surfaces 20 and end plates 24.

An especially preferred embodiment of the present invention is shown in FIGS. 4-6. The windmill 40 according to this second and especially preferred embodiment is similar to the device 10 of the first embodiment, except that rotor 44 in this embodiment has two rows A and B of wings, with four wings 18a at 90 degree intervals in the upper row A, and four wings 18b also at 90 degree intervals in the lower row B. The wings 18a in upper row A are displaced 45 degrees from the adjacent wings 18b in lower row B. As in the first embodiment, either more or fewer than four (4) wings may be provided in each row, but in any case, the wings in each row are equally spaced circumferentially (e.g. 60 degrees apart if there are 6 wings in each row), and the angular displacement between wings 18a and upper row A and the wings 18b and the lower row B is equal to one-half the angular displacement between adjacent wings in the same row. Wings 18a and 18b are structurally generally similar to their counterparts in FIG. 1, except that they are smaller in size for a device 40 of given height. At the tip of each wing 18a and 18b is a vertical flat strip 23 extend from top to bottom of the wing. Strips 23 extend essentially circumferentially. Otherwise wings 18a and 18b are like wings 18 in FIG. 1 except for the differences in size. Thus each wing 18a and 18b has ribs 22 and end plates 24.

The structure of the lower portion of shaft 12 and the associated bearing 28 and drive member 30 may be identical to that described with reference to FIGS. 1-3. The device accsording to the embodiment of FIGS. 4-6 is especially preferred because it has even greater wind collecting ability and efficiency than the device according to the embodiment of FIGS. 1-3.

A device according to either embodiment of this invention may be used to drive any suitable energy transducer, such as an electric generator or an air compressor, according to known principles. A large number of devices according to this invention may be used, also according to known principles, where a large power output is required. For example, a large number of windmills according to this invention may each be coupled to an electric generator, the electric generators being in parallel, and the electric generators in turn may be coupled to a common electric circuit which may include a transformer for increasing the voltage. Alternatively, the windmill may drive an air compressor, which in turn drives a piston engine or turbine. A number of such piston engines or turbines may be arranged so as to drive a single electric generator.

Applicant has provided an efficient device which uses a free source of energy, i.e. wind, in an efficient manner. By use of a number of units, substantial power output may be obtained.

While in accordance with the Patent statutes the best mode and preferred embodiment of the invention has been illustrated and described in detail. It is to be understood that the invention is not limited thereto, but that the scope is defined by the appended claims.

What is claimed is:

1. A windmill comprising:
   (a) a rotatable, vertical shaft;
   (b) a hub surrounding at least a portion of said shaft and closely spaced therefrom, said hub being secured to said shaft and rotating therewith;
   (c) at least one row of vanes secured to said hub, each row having four vanes uniformly spaced circumferentially;
   (d) each of said vanes comprising:
      (1) a vertically extending cylindrically curved surface for collecting the wind, said curved surface having a convex side and a concave side;
      (2) a thin vertically extending flange along the inner edge of said cylindrically curved surface, said flange having the same curvature as said hub and providing a surface for attachment of said vane to said hub;
      (3) means for attaching said vane to said hub via said flange;
      (4) a plurality of vertical ribs extending from the top to the bottom of said curved surface on the concave side thereof and intersecting said curved surface at right angles;
      (5) a substantially tangential flat vertical end strip intersecting the outer edge of said curved surface at an obtuse angle and extending rearwardly from said curved surface; and
      (6) a pair of horizontal end plates secured to said curved surfaces at the upper and lower ends, respectively, thereof, each of said end plates having a convex curved leading edge at the intersection with said curved surface, and a straight trailing edge extending from said hub to said end strip, said trailing edge being parallel to a radius of said windmill and forwardly offset therefrom,
   (e) the curved surfaces of all of said vanes being oriented in the same direction of rotation.

2. A windmill according to claim 1 in which said ribs terminate short of the trailing edges of said end plates.

3. A windmill according to claim 1 in which there is a single row of vanes.

4. A windmill according to claim 1 in which there are two axially placed rows of vanes, each row having four vanes, the vanes in each row being angularly displaced from the vanes in the other row.

5. A windmill according to claim 1 in which said curved surfaces and said end plates are made of sheet metal.

6. A windmill according to claim 1 including at least one horizontal brace extending from each vane to the next adjacent vane in the same row.

7. A windmill according to claim 1 including a drive element for driving a power producing device.

* * * * *